United States Patent [19]

Beckmann

[11] Patent Number: 5,437,530
[45] Date of Patent: Aug. 1, 1995

[54] HIGH-SHELF STORAGE APPARATUS

[75] Inventor: Harald Beckmann, Gevelsberg, Germany

[73] Assignee: Maschinenfabrik Alfred Schmermund GmbH & Co., Gevelsberg, Germany

[21] Appl. No.: 40,260

[22] Filed: Mar. 30, 1993

[30] Foreign Application Priority Data

Mar. 31, 1992 [DE] Germany ............... 42 10 592.7

[51] Int. Cl.6 ................. B65G 1/00; B65G 1/133
[52] U.S. Cl. ................... 414/331; 414/796.7; 414/796.9; 414/908; 414/911; 198/890; 198/435
[58] Field of Search ............ 414/331, 787, 908, 910, 414/911, 399, 796.7, 796.9; 198/362, 435; 364/478

[56] References Cited

U.S. PATENT DOCUMENTS

| | | | |
|---|---|---|---|
| 4,561,820 | 12/1985 | Matheny et al. | 414/331 |
| 4,887,953 | 12/1989 | Greub | 198/435 X |
| 4,998,857 | 3/1991 | Paravella et al. | 414/908 X |
| 5,195,687 | 3/1993 | Derichs et al. | 414/331 X |
| 5,226,778 | 7/1993 | Sekitani | 414/796.9 |

FOREIGN PATENT DOCUMENTS

| | | | |
|---|---|---|---|
| 0022441 | 11/1979 | European Pat. Off. | |
| 363722 | 4/1990 | European Pat. Off. | 414/796.9 |
| 60-262702 | 12/1985 | Japan | 414/331 |
| 61-7108 | 1/1986 | Japan | 414/331 |
| 61-267602 | 11/1986 | Japan | 414/331 |

OTHER PUBLICATIONS

Ceasare literature (1 page) received Jul. 11, 1980.

Primary Examiner—Michael S. Huppert
Assistant Examiner—Stephen Gordon
Attorney, Agent, or Firm—Chilton, Alix & Van Kirk

[57] ABSTRACT

A multi-tier storage unit is defined by vertical array of rotary conveyors. Independently operable transfer devices for transferring devices to be stored onto selected conveyors and retreiving stored products from the conveyors are positioned at a pair of spaced points along the sides of the storage unit. The retrieval apparatus includes one or more distributors in the form of trolley systems which operate at preselected vertical levels.

20 Claims, 2 Drawing Sheets

HIGH-SHELF STORAGE APPARATUS

BACKGROUND OF THE INVENTION

1. Field of the Invention

The present invention relates to the storage and retrieval of stackable products and particularly to facilitating the temporary storage of products, reels of packaging material for example, which have a high turnover frequency. More specifically, this invention is directed to a storage system which comprises a plurality of endless conveyors, arranged horizontally one above the other in plural storage tiers, and especially to such a storage system which includes the capability of simultaneously delivering products to storage and extracting products from storage for consumption. Accordingly, the general objects of the present invention are to provide novel and improved methods and apparatus of such character.

2. Description of the Prior Art

"High-shelf" storage units are known in the art. An example of such a prior art storage unit may be seen from published German application DE-A-3,234,817. The prior art "high-shelf" storage units, as exemplified by the referenced German application, employ vertically movable carriers for transferring products to and from the storage "shelves". These vertically movable carriers are also movable along the length of the storage unit. The "shelves" of the storage unit of the referenced application are in the form of horizonally arranged rotary conveyors. These rotary conveyors receive the in-coming products from the vertically movable carriers and, upon extraction of the stored products from the storage unit for use, they must be returned to the carriers. Thus, the products, typically resting on pallets or the like, will be supplied on a first conveyor, stored, subsequently extracted from storage, and removed from the storage unit on a second conveyor.

A long standing disadvantage of the prior art high-shelf storage units, as exemplified by the system of the referenced German application, resides in the fact that the access times to the stored products are relatively long. Accordingly, product throughput and availability is relatively low. This low throughput and availability is primarily attributable to the fact that the loading of products onto the shelves of the storage unit and the subsequent unloading step is accomplished by means of the same horizontally and vertically movable carriers. Also, the prior art has not met the demand for storage units which are as small as possible, i.e., storage units characterized by high volumetric efficiency, and which can accommodate a high turnover frequency and thus minimize stock requirements. As a further disadvantage of the prior art, the previously available high-shelf storage units were not well suited for use in the temporary storage of different products for which there were differing demands.

SUMMARY OF THE INVENTION

The present invention overcomes the above-briefly described and other deficiencies and disadvantages of the prior art by providing a novel and highly efficient technique for the multi-level storage and retrieval of products, including mixed products for which the demand differs. The present invention also encompasses a unique high-shelf storage unit for use in the practice of this novel method and particularly a storage unit which, when compared to the prior art, is characterized by greatly reduced access time, improved availability of stored product and, consequently, as small a stock of stored products as possible.

The objects of the present invention are achieved, in part, through the use of transfer devices which are respectively positioned adjacent a multi-level, i.e., a high-shelf, storage unit at a loading station and an unloading station. Apparatus in accordance with the present invention further includes at least one distributor, the distributor having carriers for at least one product, which extends adjacent to the unloading station. The height of the distributor device will be selected to be an integral multiple of the height of the high-shelf storage unit divided by the number of distributor devices increased by one.

In accordance with the practice of the present invention, products to be stored can be loaded onto the tiers or levels of the high-shelf storage system at one side thereof while products required for downstream consumption can be extracted simultaneously from storage at a displaced point on the high-shelf storage unit. The amount of travel of a transfer device, which must be executed during the extraction operation, will be relatively small since one or more of the distributor devices which receive the extracted product(s) are arranged adjacent to the transfer device and, accordingly, there will be product receivers disposed at one or more vertical levels within the height of the high-shelf storage unit. As an example, in a system where a single distributor device is utilized, the distributor device will be arranged approximately at the mid-point of the height of the high-shelf storage unit. When a pair of distributor devices are employed, these devices will be located approximately at one-third and two-thirds of the height of the high-shelf storage unit. Thus, as noted, the travel of a transfer device between the respective storage tier and the cooperating distributor will be relatively small. Additionally, a hierarchical arrangement of the products being stored can be employed, i.e., products needed more often can be positioned in storage tiers located closer to a distributor device than products which are needed less often.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures in which.

DESCRIPTION OF THE DISCLOSED EMBODIMENT

Figure 1:
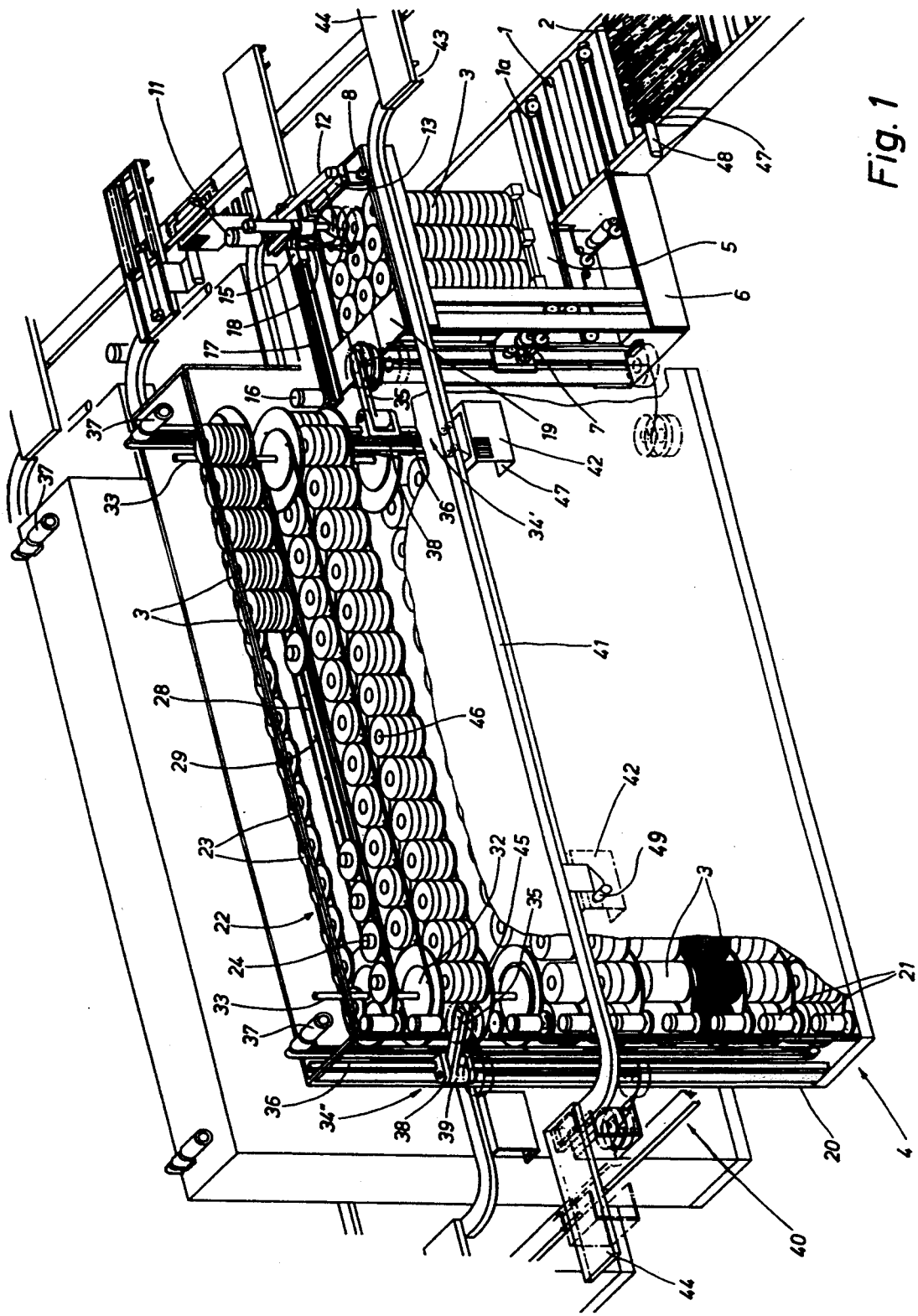
FIG. 1 is a schematic illustration, in perspective and partly cut away to show detail, of a high-shelf storage system in accordance with the present invention, the storage system of FIG. 1 including plural multi-level shelf units.

With reference to the drawings, a storage system including a plurality of high-shelf storage units in accordance with the present invention is depicted schematically in FIG. 1. As shown in FIG. 1, the objects 3 which are to be stored and subsequently retrieved from storage have a generally cylindrical shape and may, for example, be supply reels containing packaging material. These cylindrical objects are capable of being stacked in such a manner that each stack has a vertical axis. The products 3 are delivered to the storage system, by means of a conveyor which has been indicated generally at 1, on product carriers or pallets 2. Each of the pallets will typically support a plurality of rows of stacked products with the contents of an incoming pallet typically defining a compact, generally cuboid shaped product group.

The storage system of the present invention will comprise at least one, and typically a plurality of parallelly oriented and spatially separated, high-shelf storage units as indicated generally at 4. These storage or shelf units 4 are elongated, when viewed in horizontal projection, and are arranged so as to leave aisles between each of the individual units 4. The conveyor 1 for delivering products for storage extends across one of the two narrow end faces of the shelf units 4.

A lifting table or elevator 5 is associated with each shelf unit 4. Lifting table 5 may be activated, by means of energizing a drive 7, so as to move vertically within a frame 6 along the end face of the shelf unit 4. The transfer of a pallet 2 from conveyor 1 onto lifting table 5, and also movement of a pallet 2 in the opposite direction, is produced by means of a transverse drive in the form of belts 1a or through the use of a slide device or the like.

In the disclosed embodiment of the invention, frame 6 extends to approximately half the height of shelf unit 4. At the top of frame 6, i.e., at the maximum level to which a loaded pallet 2 may be raised by lifting table 5, a horizontal frame 8 is provided. Frame 8 carries a vertically movable gripping device 12. Gripping device 12 is driven in the vertical direction by means of a drive mechanism 11. The drive mechanism 11 and associated gripping device 12 are, in turn, movable in the horizontal direction along a guide rail 13 under the influence of a further drive 14 mechanism. The horizontal guide rail 13, in turn, is mounted on a carriage 15 which is itself movable, under the influence of yet a further drive 16 mechanism, along a guide rail 17 which is oriented perpendicularly with respect to both of rail 13 and frame 6. Accordingly, the gripping device 12 may be positioned at any desired location within the bounds of frame 8 and raised or lowered so as to engage and subsequently lift a product located at the top of the stack supported on a pallet 2 present on the lifting table 5.

The positioning and operation of the gripping device 12 can be monitored by means of a sensor 18 which may, for example, include a television camera. The sensor 18 is supported on the gripping device 12 and has the ability of detecting the edge of a product 3 relative to the product engaging mechanism. Thus, sensor 18 may, in addition to or as an alternative to a TV camera, include a feeler or the like coupled to a limit switch. As yet a further alternative, the movements of the gripping device 12 may be either programmed or accurately controlled in some other appropriate manner. In any event, when a product 3 is engaged by the gripping device 12, the product will be caused to move upwards and also in the direction of the shelf unit 4 into a predetermined position. This predetermined position will typically be an end position wherein the product supported by gripping device 12 will be located above a supporting table or shelf 19, table 19 being located adjacent to shelf unit 4 and supported on frame 8. The product 3 will be deposited by gripping device 12 on table 19 and subsequently, in the manner to be described below, transferred into the shelf unit 4. The above-described operation will continue until the uppermost layer of products 3 has been removed from the pallet 2 on the lifting table 5. The lifting table 5 will then be raised by an amount corresponding to the height of a product 3 and the transfer of the next layer of products into the shelf unit 4 will proceed.

Figure 2:
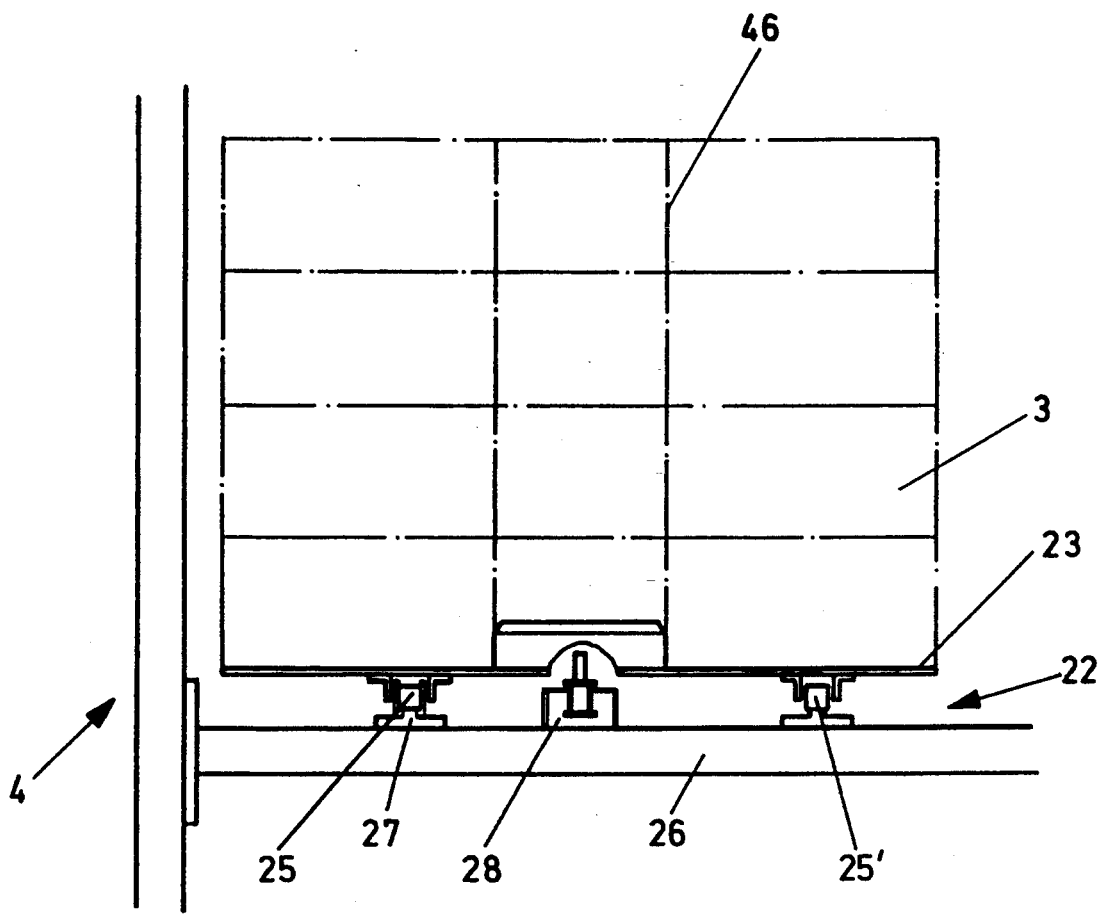
FIG. 2 is a partial end view of one of the rotary conveyors of a shelf unit of the apparatus of FIG. 1.

Each of the shelf units 4 comprises a frame or stand 20 in which are supported the means which define a plurality of storage tiers or shelves. In the disclosed embodiment, each storage tier is in the form of an endless conveyor, such as indicated generally at 22 in FIGS. 1 and 2, which has a drive 21 associated therewith. Each conveyor 22 of the disclosed embodiment comprises a plurality of interconnected support plates 23 which function as carrying elements for one or more of the products 3. In the typical use environment, a plurality of the products 3 will be stacked on each support plate 23. In the disclosed embodiment the support plates 23 are each provided with a centrally located pin or hub 24 which engages the hollow core region of a product 3 and insures that the lowermost of a plurality of products to be stored on the plate will be centered. Products subsequently added to the stack on a plate will be arranged coaxially with respect to the lowermost product.

Figure 3:
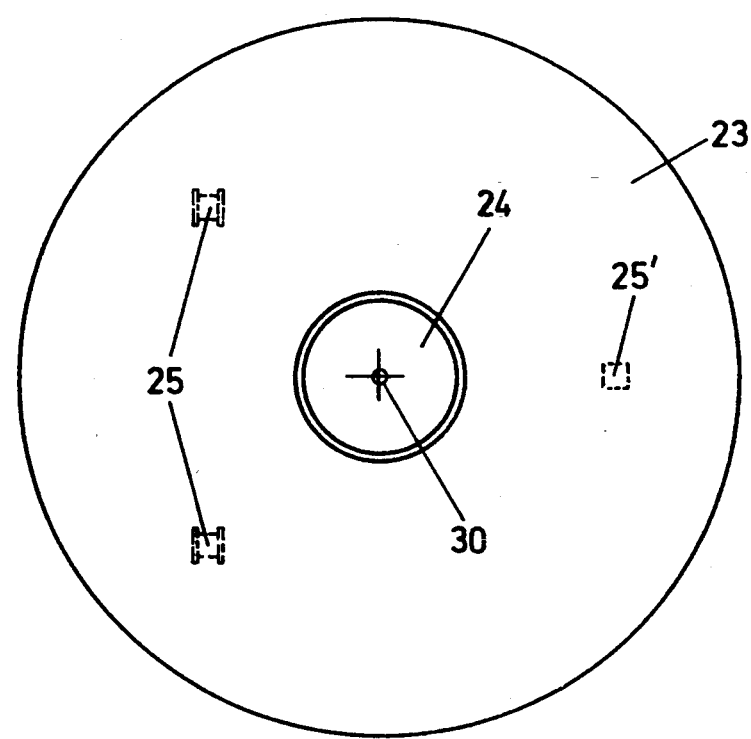
FIG. 3 is a top view of a support plate of the rotary conveyor of FIG. 2.

As best seen from FIG. 3, the underside of the support plates 23 may be provided with rollers 25, 25'. These rollers engage rails 27 which are arranged on floor members 26 disposed intermediate the tiers of the shelf unit 4. The plates 23 are serially interconnected by means of a chain 28, chain 28 having drive pins 29 which engage recesses 30 on the undersides of the plates 23. Referring to FIG. 3, in the preferred embodiment each plate is provided with a pair of "outside" guide rollers 25 and a single "inside" running roller 25'. The chain 28 is driven by drive 21 and, at the opposite narrow ends of the shelf unit 4, passes about sprockets 32, at least one of these sprockets 32 being connected to drive 21. The sprockets 32 of all of the tiers of shelf unit 4 at each end thereof are preferably mounted for rotation about common vertical axes 33 located adjacent each end of the shelf unit. The interconnected plates 23 and their drive mechanism thus constitute continuous conveyors.

As an alternative to the above-described drive arrangement for the support plates which define each storage tier of shelf unit 4, the plates 23 may be guided along a groove by means of a groove engaging pin, the pin being provided with a guide roller if necessary. In such an alternative arrangement, the support plates 23 may also be linked together so as to themselves define a chain, this interlinking being accomplished through the use of arms which engage pins on adjacent plates. As yet a further alternative, the support plates 23 can be interlinked via drive belts. Also, if necessary or desirable, one support plate 23 of each rotary conveyor 22 can be provided with a variable extension, in the conveying direction, in order to permit compensation for any play in the continuous conveyor loop.

Each of the shelf units 4 is provided, on its two narrow sides, and thus in a region adjacent to the axes about which the continuous rotary conveyors 22 turn, with a transfer device. These transfer devices have been indicated generally at 34' and 34". The transfer devices 34' and 34" are capable of independent actuation and each comprises a gripping device 35 which is pivotal in a horizontal plane about a vertical axis. The gripping devices 35 are operated by drive mechanisms 39 mounted on carriages 38. The carriages 38 are movable, under the influence of associated drives 37, along vertical rails 36.

The gripping device 35 of transfer device 34' i.e. the product gripper located at the receiving end of shelf unit 4, engages products 3 which have been deposited on the support table 19 and transfers such product, either singly or in the form of a product stack, onto a plate 23 of a rotary conveyor 22. During this transfer, the gripping device 35 will be vertically positioned so that the engaged product(s) may be pivoted into position where a conveyor plate having space to receive the product(s) being transferred is located. Thus, products being placed in storage may be delivered, via the transfer device 34', to any desired storage tier.

At the retrieval end of each shelf unit 4, the gripping device 35 of the transfer device 34" operates in the same manner as above-described with respect to the incoming products to remove a product 3 or a stack of products from an adjacent support plate 23 of a rotary conveyor 22 and to transfer the thus removed product(s) to a distributor device which has been indicated generally at 40. As will be obvious, this retrieval operation includes, as necessary, vertical adjustment of the position of the transfer device 34" and the imparting of pivotal motion to the associated gripper device 35.

It is to be noted that the transfer of products 3 from a pallet 2 to the shelf unit 4 can also be accomplished by means other than that described above such as, for example, through use of the transfer means described in published German application DE-A-3,234,817.

In the disclosed embodiment of the invention, the distributor 40 is in the form of a monorail-type conveyor which has a rail 41 of approximately C-shaped profile. The rail 41 defines a motion path for trolleys 42. This motion path includes a path portion which is juxtapositioned to the operational zone of the transfer devices 34". The trolleys 42 are electrically operated, are suspended from rail 41, and may be remotely controllable. Power for operating the trolleys is delivered thereto via conductors 43 supported by and electrically insulated from the rail 41. In the disclosed embodiment, the rail 41 is provided with racks, not shown, which are engaged by a pinion on the drive shaft of the trolley mounted drive motor.

In a storage system which employs a plurality of shelf units 4, it is desirable to employ switches 44 so that the trolleys 42 can be transferred between rails such as rails 41 and 41'. The employment of such switches eliminates the possibility of a build-up of products awaiting transfer to a trolley as might occur if only a predetermined number of trolleys was assigned to each rail. As will be obvious to those skilled in the art, other trolley arrangements are possible such as, for example, arrangements wherein the trolleys are mounted on, rather than being suspended from, the rails 41.

In order to minimize the travel of the transfer device 34" during product retrieval, more than one distributor 40 may be arranged adjacent to the transfer device. In such case, the vertical distribution of the plural distributors will be according to an integral multiple of the shelf unit height divided by the total number of distributors 40 increased by one. Thus, with a single distributor 40 as shown, the guide rail 41 for the transport trolleys 42 would be arranged above the support base of the shelf unit a distance approximately equal to one-half the height of the shelf unit. When two distributors 40 are employed, the associated rails 41 will respectively be positioned approximately at one-third and two-thirds of the shelf unit height. When more than one distributor is utilized, it may be desirable to link the guide rails of the distributors by means of vertical switches.

The spatial relationship between the transfer devices 34' and 34", and particularly the disclosed arrangement wherein these devices are offset by essentially 180° relative to the paths defined by the rotary conveyors 22 of shelf units 4, permits the transfer devices to be operated simultaneously. In order to facilitate the simultaneous delivery of products into and the retrieval of products from shelf units 4, it is expedient for each storage tier to have a receiving capacity at least equivalent to the number of products which may be delivered by means of two pallets. This enables the extraction operation to begin immediately after a pallet 2 has been unloaded while the loading of products 3 from a pallet into the same storage tier is begun. Accordingly, in the practice of the present invention, an exceptionally high turnover frequency with a correspondingly small stock may be achieved.

The transfer devices 34', 34" have an initial or home position which corresponds to the mid-height of the shelf unit 4. Thus, in the disclosed embodiment, transfer device 34" is initially at the level of distributor 40. This minimizes travel of the transfer device as required for the storage and retrieval operations.

When very tall shelf units employing plural distributors are utilized, it has been found desirable to configure the lifting table 5 and frame 8 such that a full pallet 2 can be positioned between the lifting table and frame. With a full pallet positioned between table 5 and frame 8, the support table 19 may be brought, via the lifting table 5, to a height corresponding to the height of the particular storage tier to be filled. Thereafter, the gripping device 35 of the transfer device 34' need only be pivoted in order to load a storage tier. In the disclosed embodiment this mode of operation is not possible for the lowest storage tier(s). To implement this transfer mode in the case of the lowest storage tiers, the lifting table 5 would have to additionally be capable of being lowered below the the base of the shelf unit or additional vertical movement of the gripper 35 must be accommodated. This problem may be addressed by storing products 3 for which there is the least demand on the lower storage tiers.

In the disclosed embodiment, the gripping devices 12, 35 are inserted into axial orifices 46 in the products 3, i.e., the disclosed products are in the form of reels which are internally gripped by tongue like or expanding (spreadable) jaws. It is also possible to employ gripping devices with jaws which engage the outer circumference 45 of the products. If the products being stored have a mix of axial heights, the gripping devices 12, 35 may be designed as reversible grippers with jaws having oppositely disposed gripping surfaces with the ability to engage either the exterior or an interior surface of a product and/or having plural gripping depths.

As noted above, the products 3 in the disclosed embodiment are reels of packaging material which are of generally cylindrical shape and have a hollow reel core. In the packaging of products such as cigarettes, it is necessary to have a plurality of supply reels containing different packaging materials of differing widths. Thus, supply reels containing the raw material comprising the cigarette paper itself, the inner paper of the packages, the outer paper of the packages, the collars employed on hinged-lid packs, the wrapping foil for the packs, the tear-open strips for the packs and the revenue stamps will all have different dimensions. Additionally, there may be different reels for the stick packaging and, when changes of brand name must be taken into account, there may be multiple reels for outer paper having different printing thereon. The present invention has the ability of accommodating supply reels for all of these different materials. Obviously, the present invention is also suitable for use in supplying packaging material for many other products.

The pallets 2 and the transport trolleys 42 are provided with means 47 which provide identifying information. This identifying information may, for example, indicate product type and/or quantity. The identifying information can be machine and/or human readable and the medium on which the information is written will customarily be replacable in the interest of enhancing the flexibility of the storage system. In the disclosed embodiment, the data carriers 47 on the pallets 2 are read in the region of the lifting table 5 by means of a reader 48 which transmits the information to a computer based control for the storage system. The control computer stores information concerning the type and quantity of the arriving products 3 and controls the storage location of the products on the available storage tiers of the shelf unit 4 by controlling the operation of transfer device 34' and the rotary conveyors. The control computer may also supervise the delivery of the required quantity of products 3 from storage onto the transport trolleys 42 of the distributor or distributors 40. The information on data carriers 47 on the trolleys will be rewritten as necessary to indicate the type and quantity of product to be transferred onto the transport trolleys 42. Readers 49 are provided on the rails 41 for reading the information contained on the passing trolley mounted data carriers 47 and this information will be employed by the control computer to exercise control over the retreival operation, i.e., over operation of transfer device 34", the tolleys 42 and the conveyor drives. The information read from the data carriers may also be employed for inventory control purposes and to control, via switches 44, the travel of the transport trolleys after they have been loaded with products retrieved from storage.

The control computer may be programmed so as to distribute the products 3 to the storage tiers of the shelf units 4 hierarchically. Thus, the products 3 which are consumed at the fastest rate may be stored in regions adjacent to the distributor device 40 so that the transfer devices 34' and 34" will execute as small a travel as possible during the storage and retrieval of these products. For example, in a cigarette production and packaging installation, the product consumed at the greatest rate is the cigarette paper and the reels of such paper will thus be stored on the support plates 23 of the rotary conveyors 22 located closest to the guide rail(s) 41. The control computer can be programmed so that it makes the decisions as to the appropriate hierarchy based upon product retreival past experience.

While a preferred embodiment has been shown and described, various modifications and substitutions may be made thereto without departing from the spirit and scope of the invention. For example, the apparatus of the invention may employ plural transfer devices 34' and 34". Accordingly, it is to be understood that the present invention has been described by way of illustration and not limitation.

What is claimed is:

1. A multi-tier system for the temporary storage of consumable stackable products which are utilized at a rate of consumption, stacks of products being delivered to said system on reusable carriers, the products having an axis, the carriers having a maximum capacity defined by the maximum number of products that can be carried, and each carrier and stack of products having a height, said storage system comprising:

a plurality of storage tiers situated in a vertical array to define a shelf unit having plural storage tiers for the products, each of said tiers defining a single generally horizontal product support surface comprising a rotary conveyor having a plurality of horizontally adjacent product support positions, each of said rotary conveyors comprising a drive means, each of said rotary conveyors having a capacity, said conveyor capacity being definable by the maximum capacity of a carrier wherein said rotary conveyor capacity is greater than the maximum capacity of a carrier, said conveyors having vertically aligned loading positions and vertically aligned unloading positions, said loading and unloading positions being horizontally displaced and being oppositely disposed relative to said shelf unit;

first transfer means for delivering products to said rotary conveyors, said first transfer means comprising:

supply conveyor means for delivering stacks of products to be stored to a said loading position of said plurality of storage tiers; and means for transferring the products from said supply conveyor means to selected ones of said rotary conveyors;

second transfer means for retrieving products from said rotary conveyors, said second transfer means being adjacent a said unloading position of said plurality of storage tiers, said second transfer means comprising:

a plurality of distributor means, each of said distributor means including a plurality of product receivers and means defining a path of movement for said receivers, each of said path defining means being located intermediate an uppermost and a lowermost rotary conveyor of said plurality of tiers, each of said path defining means locations defining a vertical position, the vertical position of each of said path defining means being an integral multiple of the vertical height of said plurality of tiers divided by the number of said distributor means increased by one; and means for selectively engaging products stored on said rotary conveyors and moving said products from said conveyors to said distributor means receivers;

wherein products are stored as a function of product throughput rate such that the lower the rate of throughput the further the product will be stored from said plurality of distributor means.

2. The apparatus of claim 1 wherein the vertical position of one of said plurality of distributor means is one-half the height of said shelf unit.

3. The apparatus of claim 1 wherein said conveyor capacity being definable by the maximum capacity of a carrier wherein said conveyor capacity is at least equal to two times the maximum capacity of a carrier.

4. The apparatus of claim 1 wherein said supply conveyor means is adapted for receiving the products with said axes oriented substantially vertically and said apparatus is adapted for maintaining said vertical orientation when the products are transferred, stored and retrieved from storage.

5. The apparatus of claim 1 wherein said rotary conveyors each comprise a plurality of interconnected support members, each of said support members defining one of said product support positions.

6. The apparatus of claim 1 wherein said means for transferring includes lift means, said lift means being juxtapositioned to said supply conveyor means and adapted for receiving stacks of products from said supply conveyor means, said lift means being adapted for transporting stacks of products to a vertical extraction position located adjacent said storage unit.

7. The apparatus of claim 6 wherein said means for transferring further comprises a support table positioned substantially at said extraction position, whereby products are transferred from said lift means to said support table before being transferred to a said rotary conveyor.

8. The apparatus of claim 7 wherein said means for transferring further comprises first gripper means for moving products from said lift means to said support table.

9. The apparatus of claim 8 wherein said means for transferring includes first frame means, said first frame means defining a product pick-up area, said first gripper means being displacable in two directions on said first frame means so as to be capable of engaging products located within said pick-up area.

10. The apparatus of claim 9 wherein said support table is affixed to said first frame means.

11. The apparatus of claim 7 wherein said support table is located at a vertical height which is approximately equal to one-half of the vertical height of said shelf unit.

12. The apparatus of claim 9 wherein said first frame means is supported from said lift means, said first frame means being positioned above said supply conveyor means at a height, said first frame height being definable by the maximum height of a carrier plus a product stack wherein said first frame height equals the maximum height of a carrier plus a product stack.

13. The apparatus of claim 1 wherein said means for transferring products from said supply conveyor means and said means for moving products from said conveyors to said distributor means each comprise product gripping means, said gripping means being movable vertically along axes which are oriented generally transverse to the planes defined by the support surfaces of said tiers, said gripping means further being pivotal about said axes in order to swing products engaged thereby into and out of registration with a said rotary conveyor.

14. The apparatus of claim 13 wherein said gripping means each are provided with tongue-like jaws.

15. The apparatus of claim 13 wherein said gripping means are each provided with spreadable jaws.

16. The apparatus of claim 13 wherein said gripping means are adapted to grip either an internal wall or the exterior of a product, said gripping means being provided with jaws having oppositely disposed gripping surfaces whereby a product may be engaged by opening or closing said jaws.

17. The apparatus of claim 1 wherein said distributor means receivers comprise electrically driven transport trolleys and wherein said movement path defining means comprises a rail along which said trolleys are driven.

18. The apparatus of claim 17 wherein said trolleys and the carriers are each provided with indicia bearing means, said apparatus further comprising carrier indicia reading means for providing information for use in exercising control over the storage and retrieval of the products and trolley indicia reading means for providing information for use in exercising control over the storage and retrieval of the products.

19. The apparatus of claim 1 further comprising control means for causing said first and second transfer means to store products on said rotary conveyors such that products having the highest retrieval frequency will be stored on said rotary conveyors which are closest to said plurality of distributor means.

20. The apparatus of claim 18 further comprising control means responsive to information provided by said carrier and trolley indicia reading means for causing said first transfer means to route products being stored to storage tiers of said shelf unit as a function of product throughput rate such that the lower the rate of consumption the further the product will be stored from a said plurality of distributor means.

* * * * *